(Model.)
F. R. SMITH.
DAMPER.
No. 356,169. Patented Jan. 18, 1887.
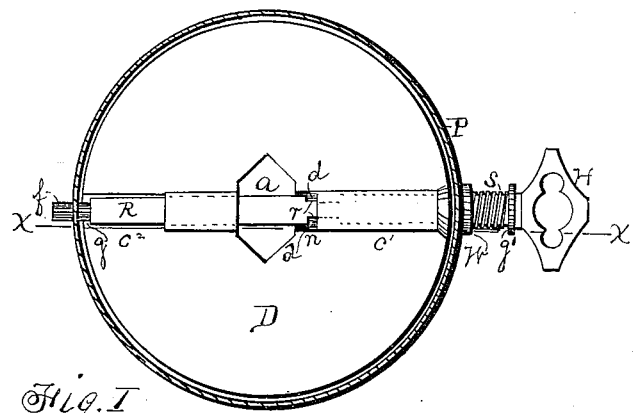
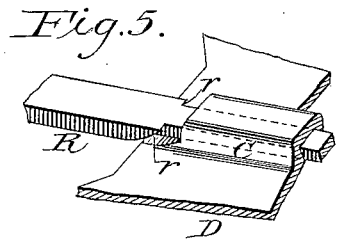
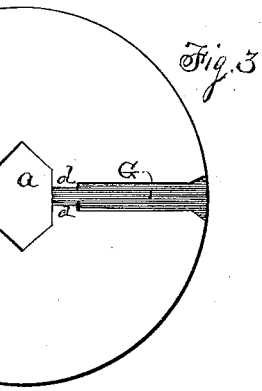
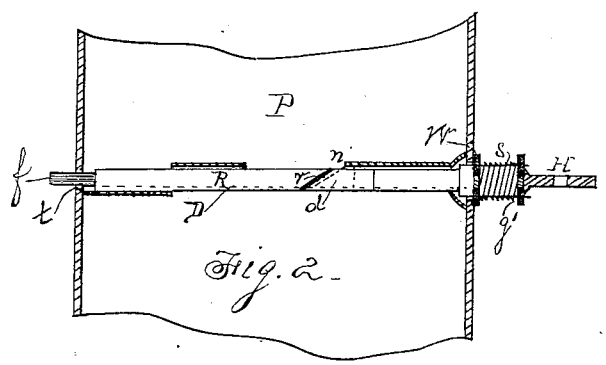
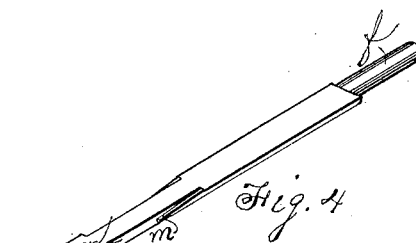
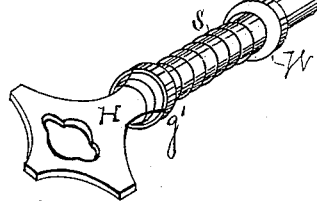
Witnesses
Thos Whitson
J. M. Walker
Inventor
Frank R. Smith
pr Wm. R. Gerhart
His Attorney

UNITED STATES PATENT OFFICE.

FRANK R. SMITH, OF MANHEIM, PENNSYLVANIA, ASSIGNOR OF ONE-HALF TO THOMAS H. SMITH, OF SAME PLACE.

DAMPER.

SPECIFICATION forming part of Letters Patent No. 356,169, dated January 18, 1887.

Application filed June 27, 1884. Serial No. 136,140. (Model.)

*To all whom it may concern:*

Be it known that I, FRANK R. SMITH, a citizen of the United States, residing at Manheim, in the county of Lancaster and State of Pennsylvania, have invented a new and useful Damper for Stove-Pipes, of which the following is a specification.

My invention is an improvement in dampers for stove-pipes, in which the rod which supports the damper can be inserted or withdrawn at pleasure in order to put the damper in place or remove it; and the objects of my improvements are, first, to remove the damper from or insert it in the pipe whenever desirable, and, second, to engage the damper-rod with the damper in such manner that changes of temperature will not cause the two to separate or the damper to turn otherwise than by motion communicated to it by the rod.

I attain these objects by the mechanism illustrated in the accompanying drawings, in which—

Figure 1 is a top view of the damper in place; Fig. 2, a vertical section through the line *x x* of Fig. 1; Fig. 3, a bottom view of the damper, and Fig. 4 a perspective of the lower side of the damper-rod. Fig. 5 is a perspective view showing parts of the damper-plate and spindle.

Similar letters refer to similar parts throughout the several views.

The damper-plate D, having an opening, *a*, in the center to permit the escape of gas when it is closed, has a groove, G, formed across the bottom of the side *c'* and part of the side *c²*. On the part of the side *c²* adjoining the periphery the upper side of the damper has a groove, *g*. At the inner end of the section *c'* of the groove G the top of said groove is cut away, as shown at *n*, and there is a lip, *d*, projecting inward from each side of said groove, the upper edge of which is beveled. The damper-rod R is made to fit in all the grooves, and is of just sufficient thickness to fill the grooves G in *c' c²*, and has a journal, *f*, at one end, to rest in an opening, *t*, in the pipe. Toward the center the sides of the rod R have recesses *r* to receive the lips *d* of the groove, which have beveled inner ends, *m*, constructed to engage the beveled ends of said lips *d*. The inside of the handle H of the rod R terminates in a circular flange, *g'*, and between it and the sides of the pipe P a spiral spring, S, is coiled about the rod, and bears against the washer W, inserted between it and the side of the pipe.

The application of my device is very simple. The damper is inserted in the pipe, and the rod, being entered through an opening in the pipe large enough to receive it, is passed through the bottom and top grooves of the damper, and the journal *f* pushed into the opening *t* on the opposite side of the pipe. When the journal enters its bearing, and before the recesses *r* of the rod R reach the lips of the groove, the spring S begins to act between the side of the pipe and flange of the handle. The rod is then forced in, compressing the spring until the recesses *r* receive the lips *d* and the beveled surfaces of the two engage with each other. When this is accomplished, the spring serves to hold the beveled surfaces together and maintains the connection between the rod and damper.

To remove the damper, the foregoing operation is reversed.

What I claim as my invention, and desire to secure by Letters Patent, is—

1. The combination of a damper-plate having a groove in the bottom surface of one section, *c'*, and part of the other, *c²*, and in part of the top surface of the section *c²*, the top of the inner end of the groove in section *c'* being cut away and the groove there supplied with inwardly-projecting lips beveled at their outer ends, with a damper-rod having recesses beveled at one end and constructed to engage with the said lips, a spring, and a flange, *g'*, on the said rod to serve as a bearing for the spring, substantially as specified.

2. The combination of a damper-plate having a groove extending partially across it in its lower surface and one partially across it in its upper surface, both constructed to receive the rod which supports the damper-plate, the end of one of said grooves being beveled and supplied with inwardly-projecting lips, with the said rod provided with recesses beveled at one end and adapted to engage with the said lips, a spring, and a flange attached to said rod to serve as a bearing for the spring, substantially as and for the purpose specified.

F. R. SMITH.

Witnesses:
J. B. NESSLEY,
T. H. SMITH.